United States Patent
Gan et al.

(10) Patent No.: US 11,443,445 B2
(45) Date of Patent: Sep. 13, 2022

(54) METHOD AND APPARATUS FOR DEPTH ESTIMATION OF MONOCULAR IMAGE, AND STORAGE MEDIUM

(71) Applicant: SHENZHEN SENSETIME TECHNOLOGY CO., LTD., Shenzhen (CN)

(72) Inventors: Yukang Gan, Shenzhen (CN); Xiangyu Xu, Shenzhen (CN); Wenxiu Sun, Shenzhen (CN); Liang Lin, Shenzhen (CN)

(73) Assignee: SHENZHEN SENSETIME TECHNOLOGY CO., LTD., Guangdon (CN)

(*) Notice: Subject to any disclaimer, the term of this patent is extended or adjusted under 35 U.S.C. 154(b) by 351 days.

(21) Appl. No.: 16/830,363

(22) Filed: Mar. 26, 2020

(65) Prior Publication Data
US 2020/0226773 A1 Jul. 16, 2020

Related U.S. Application Data

(63) Continuation of application No. PCT/CN2019/082314, filed on Apr. 11, 2019.

(30) Foreign Application Priority Data

Jul. 27, 2018 (CN) .......................... 201810845040.4

(51) Int. Cl.
*G06T 7/50* (2017.01)
*G06N 3/04* (2006.01)
*G06N 3/08* (2006.01)

(52) U.S. Cl.
CPC ............. *G06T 7/50* (2017.01); *G06N 3/0454* (2013.01); *G06N 3/08* (2013.01);
(Continued)

(58) Field of Classification Search
CPC ............ G06T 7/50; G06T 2207/10028; G06T 2207/20081; G06T 2207/20084; G06N 3/0454; G06N 3/08
See application file for complete search history.

(56) References Cited

U.S. PATENT DOCUMENTS

| 8,472,699 B2* | 6/2013 | Ng | .......................... G06V 10/10 |
| | | | 348/42 |
| 2008/0137989 A1* | 6/2008 | Ng | .......................... G06V 10/10 |
| | | | 382/285 |

FOREIGN PATENT DOCUMENTS

| CN | 102750702 A | 10/2012 |
| CN | 107945265 A | 4/2013 |

(Continued)

OTHER PUBLICATIONS

"Non-Official Translation: Depth Estimation on Monocular image"; Mar. 2016; Hu Tian; Information & Technology, China Doctoral, Dissertations Full-text Database, No. 3, 124 pgs.
(Continued)

*Primary Examiner* — Fayyaz Alam
(74) *Attorney, Agent, or Firm* — Cooper Legal Group, LLC

(57) ABSTRACT

A method and apparatus for depth estimation of a monocular image, and a storage medium are provided. The method includes: obtaining, through a depth estimation neural network, a global feature of a monocular image according to absolute features of preset regions and relative features among the preset regions in the monocular image; and obtaining a predicted depth map of the monocular image according to the global feature, and the absolute features of preset regions and relative features among the preset regions in the monocular image.

20 Claims, 8 Drawing Sheets

On the basis of a depth estimation neural network, obtain a global feature of a monocular image according to absolute features of preset regions and relative features among the preset regions in the monocular image — 102

Obtain a predicted depth map of the monocular image according to the global feature and the absolute features of preset regions and relative features among the preset regions in the monocular image — 104

(52) U.S. Cl.
CPC ............. *G06T 2207/10028* (2013.01); *G06T 2207/20081* (2013.01); *G06T 2207/20084* (2013.01)

(56) References Cited

FOREIGN PATENT DOCUMENTS

| | | |
|---|---|---|
| CN | 106157307 A | 11/2016 |
| CN | 106599805 A | 4/2017 |
| CN | 106780588 A | 5/2017 |
| CN | 106952222 A | 7/2017 |
| CN | 107204010 A | 9/2017 |
| CN | 107230014 A | 10/2017 |
| CN | 107553490 A | 1/2018 |
| CN | 107578436 A | 1/2018 |
| CN | 107767413 A | 3/2018 |
| CN | 108229478 A | 6/2018 |
| CN | 109035319 A | 12/2018 |
| JP | 2002222419 A | 8/2002 |
| KR | 20140088200 A | 7/2014 |
| WO | 2015043872 A1 | 4/2015 |
| WO | 2018000752 A1 | 1/2018 |

OTHER PUBLICATIONS

"Depth Recovery of Monocular Video Based on Neural Convolution Networks", Jun. 2017; Qichao Chen; China Excellent Master's Thesis Full-text Database Information Technology Series, 62 pgs.
"Monocular infrared image Depth Estimation Based on Deep Convolutional Neural Networks"; Jul. 2016; Xu Lu, Zhao Haitao and Sun Shaoyuan; Acta Optica Sinica, vol. 36, No. 7, 10 pgs.
"Depth Estimation from Monocular Images Based on DRF-MAP Model", Dec. 2009; Bei-Lei Zhang, Shao-Yuan Sun, Jiang-Wei Wu and Xiao-Jing Gu; Infrared Technology, vol. 31, No. 12, 31, pp. 712-715.
"Make3D: Learning 3D Scene Structure from a Single Still Image"; Dec. 2009; Ashutosh Saxena, Min Sun and Andrew Y. Ng; IEEE Trans. Pattern Anal. Mach., vol. 31, No. 5, 17 pgs.
"Multi-scale Continuous CRFs as Sequential Deep Networks for Monocular Depth Estimation"; Apr. 2017; Dan Xu, Elisa Ricci, Wanli Ouyang, Xiaogang Wang and Nicu Sebe; Monocular Depth Estimation, Convolutional Neural Networks, arXiv: Computer Vision and Pattern Recognition, 9 pgs.
"Predicting Depth, Surface Normals and Semantic Labels with a Common Multi-Scale Convolutional Architecture" Dec. 2015; David Eigen and Rob Fergus; Proceedings of the IEEE International Conference on Computer Vision, 9 pgs.
International Search Report in the international application No. PCT/CN2019/082314, dated Jul. 24, 2019, 3 pgs.
First Office Action of the Chinese application No. 201810845040.4, dated May 21, 2020, 16 pgs.
"Monocular Depth Estimation with Affinity, Vertical Pooling, and Label Enhancement"; Oct. 2018; Yukang Gan, Xiangyu, Wensiu Sun and Liang Lin; Cited from the Internet at: http://www.linliang.net/wp-content/uploads/2018/08/ECCV2018_MonocularDepth.pdf, 16 pgs.
English translation of the Written Opinion of the International Search Authority in the international application No. PCT/CN2019/082314, dated Jul. 24, 2019, 6 pgs.
Notice of Allowance of the Korean application No. 10-2020-7009304, dated Jul. 8, 2021, 6 pgs.
"Depth Estimation with Convolutional Conditional Random Field Network", Nov. 2016, Yan Hua and Hu Tian, Neurocomputing, vol. 214, 9 pgs.
"3-D Depth Reconstruction from a Single Still Image", Aug. 2007, Ashutosh Saxena, Sung H. Chung and Andrew Y. Ng; International Journal of Computer Visual, 17 pgs.
First Office Action of the Korean application No. 10-2020-7009304, dated Feb. 22, 2021, 15 pgs.
"Learning Depth from Single Monocular Images", Dec. 2005, Ashutosh Saxena, Sung H. Chung and Andrew Y. Ng, Proceedings of the 18th International Conference on Neural Information Processing Systems Internet, URL, https://dl.acm.org/doi/abs/10.5555/2976248.2976394, 8 pgs.
First Office Action of the Japanese application No. 2020-542490, dated Apr. 12, 2021, 5 pgs.

\* cited by examiner

METHOD AND APPARATUS FOR DEPTH ESTIMATION OF MONOCULAR IMAGE, AND STORAGE MEDIUM

CROSS-REFERENCE TO RELATED APPLICATIONS

The present application is a continuation of International Patent Application No. PCT/CN2019/082314, filed on Apr. 11, 2019, which claims priority to Chinese Patent Application No. 201810845040.4, filed on Jul. 27, 2018. The disclosures of International Patent Application No. PCT/CN2019/082314 and Chinese Patent Application No. 201810845040.4 are hereby incorporated by reference in their entireties.

BACKGROUND

The depth estimation of images is an important problem in the field of computer vision. The current depth estimation of images mainly includes: the depth estimation of monocular images and the depth estimation of binocular images. The depth estimation of monocular images is mainly to estimate depth information of images on the basis of monocular images. However, because the depth estimation of monocular images is a very challenging problem, at present, the accuracy of the depth information of monocular images predicted by many existing methods for the depth estimation of monocular images is still poor.

SUMMARY

The present disclosure relates to computer vision technologies, and in particular, to a method and apparatus for the depth estimation of a monocular image, and a storage medium. Embodiments of the present disclosure provide a technical solution for the depth estimation of a monocular image.

According to one aspect of the embodiments of the present disclosure, provided is a computer-implemented method for the depth estimation of a monocular image, including:

obtaining, through on a depth estimation neural network, a global feature of a monocular image according to absolute features of preset regions and relative features among the preset regions in the monocular image; and obtaining a predicted depth map of the monocular image according to the global feature and the absolute features of preset regions and relative features among the preset regions in the monocular image.

According to another aspect of the embodiments of the present disclosure, provided is an apparatus for the depth estimation of a binocular image, including:

a depth estimation neural network, configured to obtain a global feature of a monocular image according to absolute features of preset regions and relative features among the preset regions in the monocular image, and obtain a predicted depth map of the monocular image according to the global feature and the absolute features of preset regions and relative features among the preset regions in the monocular image.

According to yet another aspect of the embodiments of the present disclosure, provided is an electronic device, including:

a memory, configured to store executable instructions; and a processor configured to execute the executable instructions to implement the method according to any one of the embodiments.

According to yet another aspect of the embodiments of the present disclosure, provided is a computer storage medium configured to store computer-readable instructions that, when being executed, implement the method according to any one of the embodiments.

The technical solutions of the present disclosure are further described in detail with reference to the accompanying drawings and embodiments as follows.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
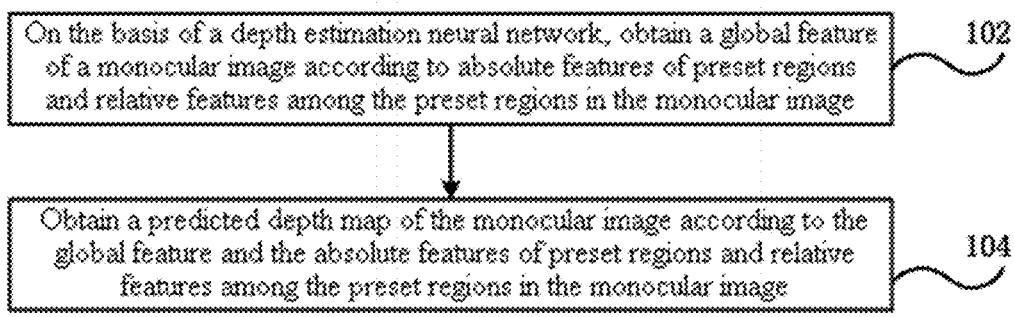
FIG. 1 is a flowchart of a method for the depth estimation of a monocular image according to some embodiments of the present disclosure.

Various exemplary embodiments of the present disclosure are now described in detail with reference to the accompanying drawings. It should be noted that, unless otherwise stated specifically, relative arrangement of the components and operations, numerical expressions, and values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage mediums including storage devices.

FIG. 1 is a flowchart of a method for the depth estimation of a monocular image according to some embodiments of the present disclosure.

As shown in FIG. 1, the method includes the following operations.

At 102, on the basis of a depth estimation neural network, a global feature of a monocular image is obtained according to absolute features of preset regions and relative features among the preset regions in the monocular image.

In the embodiments, the monocular image may be an image obtained from an image collection device, and may also be an image obtained from a storage apparatus. For example, the image collection device may be a still camera, a video camera, a scanner, or the like, and the storage apparatus may be a USB flash drive, an optical disk, a hard disk drive, or the like. The embodiments do not limit the obtaining mode of the monocular image. The absolute features of the preset regions in the monocular image are used for representing local appearances of the preset regions in the monocular image. For example, the absolute features include texture features, geometric features, or the like. The relative features among the preset regions in the monocular image are used for representing the differences between the local appearances of the preset regions in the monocular image. For example, the relative features include texture differences, geometric differences, or the like. The preset regions in the monocular image are set according to the features of the image. The depth map of the embodiments is a map that represents the distances between pixels in an image and the image collection device using the pixels values of the pixels in the image.

In an optional example, a global feature of a monocular image is obtained by combining absolute features of preset regions and relative features among the preset regions in the monocular image by means of a full connection layer.

At 104, a predicted depth map of the monocular image is obtained according to the global feature and the absolute features of preset regions and relative features among the preset regions in the monocular image.

In an optional example, depth estimation can be performed by means of a depth estimator according to the global feature of the monocular image and the absolute features of preset regions and relative features among the preset regions in the monocular image to obtain a predicted depth map of the monocular image. For example, the depth estimator may be a fully convolutional network which mainly consists of a convolution layer and a deconvolution layer. The depth estimator is able to calculate depths values of pixels in an image according to geometric distribution information of the image, i.e., a global feature of the image, and absolute features of preset regions and relative features among the preset regions in the image, to obtain the predicted depth map.

The method for the depth estimation of a monocular image provided by the embodiments obtains a global feature of a monocular image according to absolute features of preset regions and relative features among the preset regions in the monocular image on the basis of a depth estimation neural network, and obtains a predicted depth map of the monocular image according to the global feature and the absolute features of preset regions and relative features among the preset regions in the monocular image. By means of the mutual supplementation between relative features and absolute features of preset regions in an image in the depth estimation of monocular images, the accuracy of the relative distance prediction in the depth estimation is improved, such that the accuracy of the depth estimation of monocular images can be improved.

According to one or more disclosure of the present disclosure, before the obtaining a global feature of a monocular image according to absolute features of preset regions and relative features among the preset regions in the monocular image, feature extraction is further performed on the monocular image by means of a first neural network to obtain features of preset regions in the monocular image, the features of the preset regions are taken as absolute features of the present regions in the monocular image, and then relative features among the preset regions in the monocular image are obtained according to the absolute features of the preset regions in the monocular image. For example, the first neural network may be a coder network consisting of a convolution layer and a pooling layer, and high-dimension features of the image can be obtained by performing feature extraction on the monocular image by means of the coder network.

In an optional example, vector operation is performed on the absolute features of the preset regions in the monocular image by means of an association layer to obtain the relative features among the preset regions in the monocular image. The relative features among the preset regions in the image may be relative features between the preset regions in the image and preset regions within a preset range surrounding said preset regions. For example, the relative features among the preset regions in the monocular image may be obtained by performing dot product operation on feature vectors between the preset regions in the monocular image and the preset regions within a preset range surrounding said preset regions.

According to one or more disclosure of the present disclosure, before performing feature extraction on the monocular image by means of a first neural network, downsampling is further performed on the monocular image to obtain a monocular image having a preset dimension, and the monocular image having a preset dimension is taken as the monocular image on which depth estimation is performed by the depth estimation neural network to reduce the computation amount and improve the data processing speed. The dimension of the monocular image is a multiple of the preset dimension. For example, the dimension of the monocular image is 8 times of the preset dimension.

Generally, the depth variation of the image in the vertical direction is greater than the depth variation in the horizontal direction. For example, in a driving scene, a road in an image always extends along the vertical direction to a place which is farther from the video camera. Therefore, the longitudinal variation law of the depth information of the image facilitates the estimation of an absolute distance of the image. Therefore, the longitudinal variation law of the depth information of the monocular image can be used for the depth estimation of the monocular image. For example, optimization can be performed on the predicated depth map according to the longitudinal variation law of the depth information of the monocular image.

Figure 2:
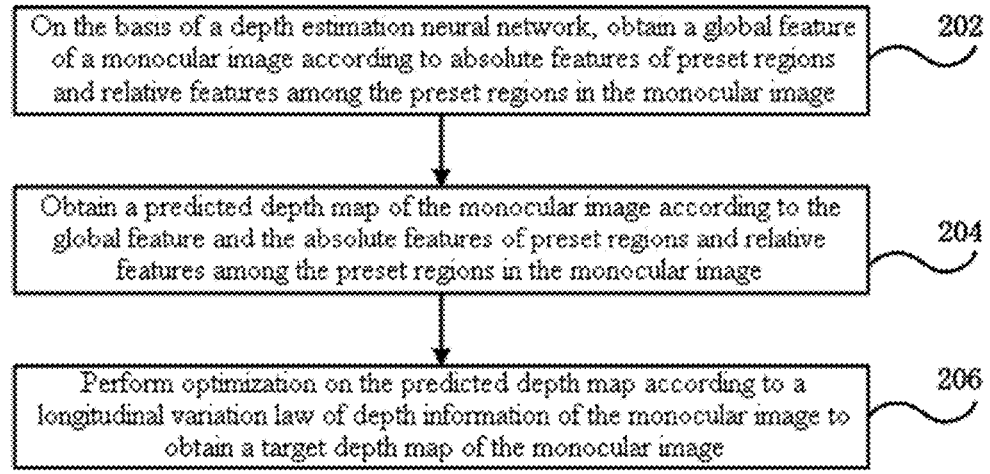
FIG. 2 is a flowchart of a method for the depth estimation of a monocular image according to other embodiments of the present disclosure.

In some embodiments, as shown in FIG. 2, after operation 204, i.e., obtaining a predicted depth map of the monocular image according to the global feature and the absolute features of preset regions and relative features among the preset regions in the monocular image, the method further includes the following operations.

At 206, optimization is performed on the predicted depth image according to a longitudinal variation law of depth information of the monocular image to obtain a target depth map of the monocular image.

According to one or more disclosure of the present disclosure, residual estimation is performed on the predicted depth map according to a longitudinal variation law of depth information of the monocular image to obtain a residual plot of the predicted depth map, and then optimization is performed on the predicted depth map according to the residual plot to obtain a target depth map of the monocular image.

In an optional example, residual estimation is performed on the predicted depth map by a residual estimation network according to a longitudinal variation law of depth information of the monocular image to obtain a residual plot of the predicted depth map, and then pixel-by-pixel superposition operation is performed on the residual plot and the predicted depth map to obtain a target depth map of the monocular image.

According to one or more disclosure of the present disclosure, before performing optimization on the predicted depth image according to a longitudinal variation law of depth information of the monocular image to obtain a target depth map of the monocular image, the longitudinal variation law of depth information of the monocular image is further obtained according to the predicted depth map.

In an optional example, processing is performed on the predicted depth map by means of a longitudinal pooling layer to obtain a longitudinal variation law of depth information of the monocular image. The longitudinal pooling layer takes a column vector as a pooling kernel to perform pooling processing on the predicted depth map. For example, the longitudinal pooling layer uses a pooling kernel having a size of H×1 to perform average pooling processing on the predicted depth map, where H is an integer greater than 1.

The method for the depth estimation of a monocular image provided by the embodiments obtains a global feature of a monocular image according to absolute features of preset regions and relative features among the preset regions in the monocular image on the basis of a depth estimation neural network, obtains a predicted depth map of the monocular image according to the global feature and the absolute features of preset regions and relative features among the preset regions in the monocular image, and performs optimization on the predicted depth map according to a longitudinal variation law of depth information of the monocular image to obtain a target depth map of the monocular image. By means of the mutual supplementation between relative features and absolute features of preset regions in an image in the depth estimation of monocular images, the accuracy of the relative distance prediction in the depth estimation is improved, and by means of optimization performed according to a longitudinal variation law of depth information of the image, the accuracy of the absolute distance prediction in depth estimation is improved, such that the accuracy of the depth estimation of monocular images can be comprehensively improved.

In some embodiments, when downsampling is performed, before performing feature extraction on the monocular image by means of a first neural network, on the monocular image to obtain a monocular image having a preset dimension, and the monocular image having a preset dimension is taken as the monocular image on which depth estimation is performed by the depth estimation neural network, a multi-scale learning method is used to perform optimization on the predicted depth map according to a longitudinal variation law of depth information of the monocular image to improve the accuracy of depth estimation of the monocular image.

According to one or more disclosure of the present disclosure, a preset number of upsamplings are performed on the predicted depth map, a longitudinal variation law of depth information is obtained according to the predicted depth map, obtained by each upsampling, having a dimension sequentially increased by a multiple, and optimization is performed on the predicted depth map, obtained by each upsampling, having a dimension sequentially increased by a multiple according to the longitudinal variation law of the depth information thereof to obtain an optimized target depth map; where the optimized target depth map obtained by each of the upsamplings other than the last upsampling is taken as the predicted depth map of the next upsampling, the optimized target depth map obtained by the last upsampling is taken as the target depth map of the monocular image, and the target depth map has the same dimension as the monocular image.

A flowchart of each scale optimization during performing optimization using multi-scale learning is described in details below with reference to FIG. 3.

Figure 3:
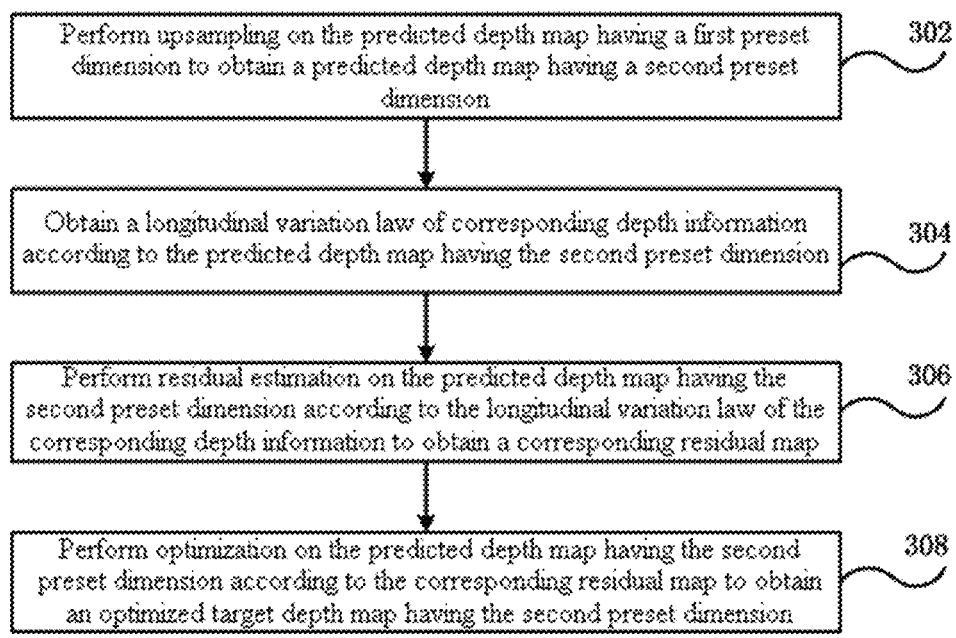
FIG. 3 is a flowchart of each scale optimization during performing optimization using multi-scale learning of the embodiments of the present disclosure.

As shown in FIG. 3, the method includes the following operations.

At 302, upsampling is performed on the predicted depth map having a first preset dimension to obtain a predicted depth map having a second preset dimension.

In the embodiments, the predicted depth map having a first preset dimension may be a predicted depth map obtained from a depth estimation neural network, and may also be an optimized target depth map obtained from a previous scale optimization process. The second preset dimension is a multiple of the first preset dimension, where the sizes of the first preset dimension and the second preset dimension are determined according to the number and frequency of upsamplings, the size of the monocular image, or the like.

In an optional example, upsampling is performed on the predicted depth map having a first preset dimension by means of an upsampling layer to obtain a predicted depth map having a second preset dimension.

At 304, a longitudinal variation law of corresponding depth information according to the predicted depth map having a second preset dimension.

In an optional example, processing is performed on the predicted depth map having a second preset dimension by means of a longitudinal pooling layer to obtain a longitudinal variation law of the corresponding depth information.

At 306, residual estimation is performed on the predicted depth map having a second preset dimension according to the longitudinal variation law of the corresponding depth information to obtain a corresponding residual map.

In an optional example, residual estimation is performed on the predicted depth map having a second preset dimension by a residual estimation network according to the longitudinal variation law of the corresponding depth information to obtain a corresponding residual map.

At 308, optimization is performed on the predicted depth map having the second preset dimension according to the corresponding residual map to obtain an optimized target depth map having the second preset dimension.

In an optional example, pixel-by-pixel superposition operation is performed on the corresponding residual plot and the predicted depth map having the second preset dimension to obtain an optimized target depth map having the second preset dimension.

Figure 4A:
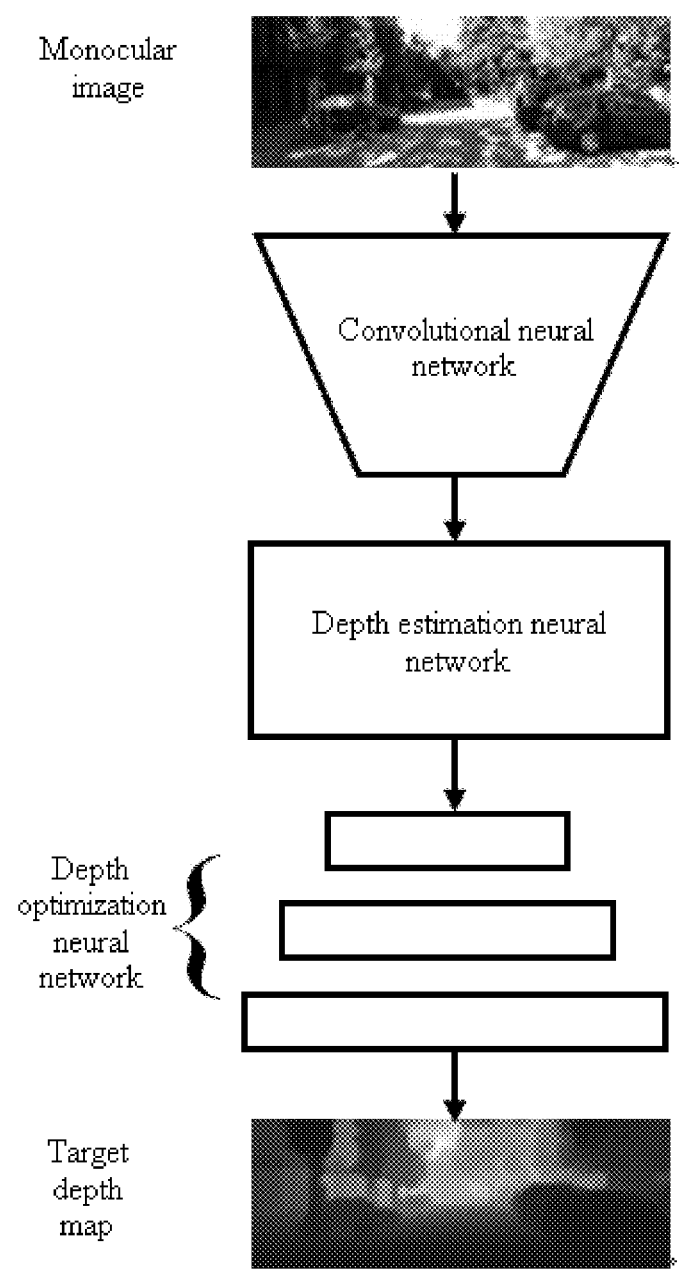
FIGS. 4A to 4C are structural schematic diagrams of networks for implementing the method for the depth estimation of a monocular image according to some embodiments of the present disclosure.
Figure 4B:
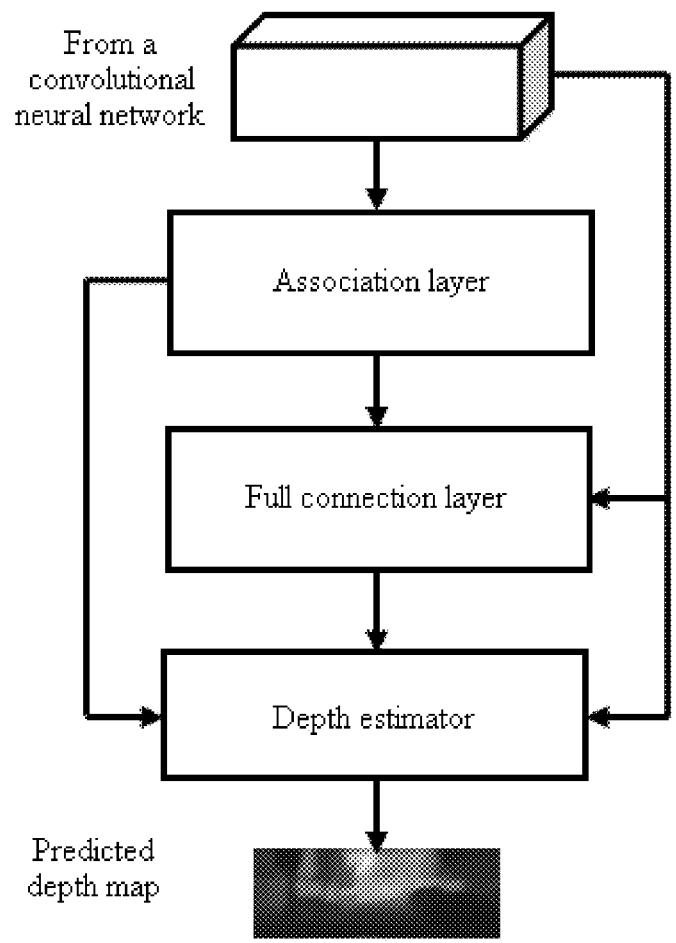
Figure 4C:
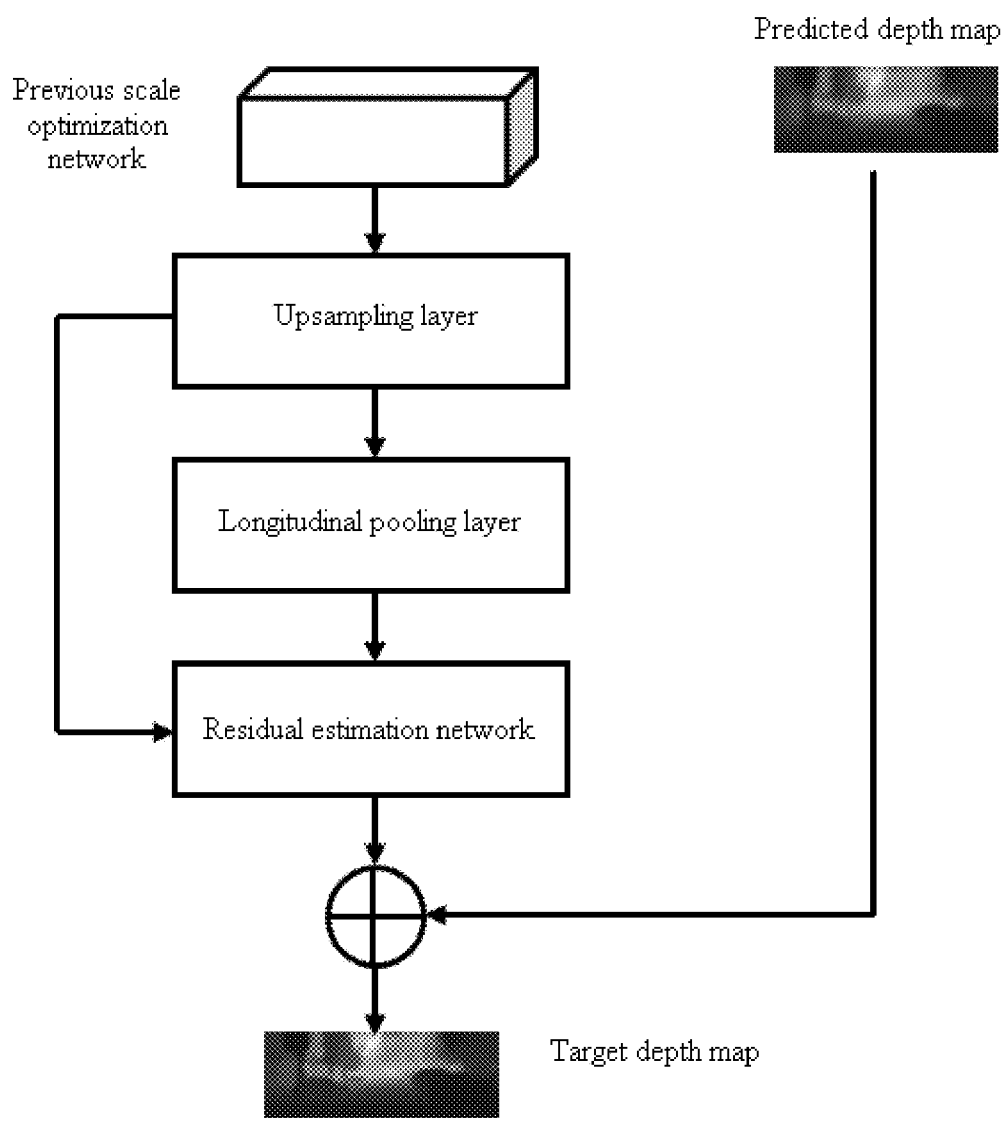

FIGS. 4A to 4C are structural schematic diagrams of networks for implementing the method for the depth estimation of a monocular image according to some embodiments of the present disclosure.

In the embodiments, as shown in FIG. 4A, a network for implementing the method for the depth estimation of a monocular image according to embodiments of the present disclosure includes: a convolutional neural network, a depth estimation neural network, and a depth optimization neural network. The convolutional neural network includes a downsampling layer and a first neural network. The downsampling layer performs 8-time downsampling on the monocular image to obtain a monocular image having a dimension which is $\frac{1}{8}$ of the dimension of said monocular image, and then the first neural network performs feature extraction on the $\frac{1}{8}$-dimension monocular image to obtain absolute features of preset regions in the $\frac{1}{8}$-dimension monocular image.

As shown in FIG. 4B, the depth estimation neural network includes: an association layer, a full connection layer, and a depth estimator, where the association layer obtains relative features among the preset regions in the $\frac{1}{8}$-dimension monocular image according to the absolute features of the preset regions in the $\frac{1}{8}$-dimension monocular image, the full connection layer obtains a global feature of the $\frac{1}{8}$-dimension monocular image according to the absolute features of the preset regions and the relative features among the preset regions in the $\frac{1}{8}$-dimension monocular image, and the depth estimator obtains a $\frac{1}{8}$-dimension predicted depth map according the global feature of the $\frac{1}{8}$-dimension image and the absolute features of the preset regions and the relative feature among the preset regions in the $\frac{1}{8}$-dimension monocular image.

In the embodiments, the depth optimization neural network includes a first scale optimization network, a second scale optimization network, and a third scale optimization network, where the structure of each scale optimization network, as shown in FIG. 4C, includes an upsampling layer, a longitudinal pooling layer, a residual estimation network, and an additive operation unit.

The upsampling layer of the first scale optimization network performs 2-time upsampling on the $\frac{1}{8}$-dimension predicted depth map to obtain a $\frac{1}{4}$-dimension predicted depth map. The longitudinal pooling layer of the first scale optimization network obtains a longitudinal variation law of corresponding depth information according to the $\frac{1}{4}$-dimension predicted depth map. The residual estimation network of the first scale optimization network performs residual estimation on the $\frac{1}{4}$-dimension predicted depth map according to the longitudinal variation law of the depth information corresponding to the $\frac{1}{4}$-dimension predicted depth map to obtain a corresponding residual plot. The additive operation unit of the first scale optimization network performs pixel-by-pixel superposition operation on the corresponding residual plot and the $\frac{1}{4}$-dimension predicted depth map to obtain an optimized $\frac{1}{4}$-dimension target depth map, and takes the optimized $\frac{1}{4}$-dimension target depth map as the predicted depth map of the second scale optimization network.

The upsampling layer of the second scale optimization network performs 2-time upsampling on the optimized $\frac{1}{4}$-dimension target depth map to obtain a $\frac{1}{2}$-dimension predicted depth map. The longitudinal pooling layer of the second scale optimization network obtains a longitudinal variation law of corresponding depth information according to the $\frac{1}{2}$-dimension predicted depth map. The residual estimation network of the second scale optimization network performs residual estimation on the $\frac{1}{2}$-dimension predicted depth map according to the longitudinal variation law of the depth information corresponding to the $\frac{1}{2}$-dimension predicted depth map to obtain a corresponding residual plot. The additive operation unit of the second scale optimization network performs pixel-by-pixel superposition operation on the corresponding residual plot and the $\frac{1}{2}$-dimension predicted depth map to obtain an optimized $\frac{1}{2}$-dimension target depth map, and takes the optimized $\frac{1}{2}$-dimension target depth map as the predicted depth map of the third scale optimization network.

The upsampling layer of the third scale optimization network performs 2-time upsampling on the optimized $\frac{1}{2}$-dimension target depth map to obtain a predicted depth map having the same dimension as the monocular image. The longitudinal pooling layer of the third scale optimization network obtains a longitudinal variation law of corresponding depth information according to the predicted depth map having the same dimension as the monocular image. The residual estimation network of the third scale optimization network performs residual estimation on the predicted depth map having the same dimension as the monocular image according to the longitudinal variation law of the depth information corresponding to the predicted depth map to obtain a corresponding residual plot. The additive operation unit of the third scale optimization network performs pixel-by-pixel superposition operation on the corresponding residual plot and the predicted depth map having the same dimension as the monocular image to obtain an optimized target depth map having the same dimension as the monocular image, and takes the optimized target depth map as the target depth map of the monocular image.

In an optional example, the depth estimation neural network of the forgoing embodiments is obtained by performing semi-supervised training using a dense depth map obtained by means of stereoscopic binocular image matching and a sparse depth map as marking data.

In the embodiments, because the "marking data" of training data obtained using other methods is sparse, i.e., there are a small number of valid pixel values in a depth map, a depth map obtained using binocular matching is taken as the "marking data" of the training data.

The method for the depth estimation of a monocular image provided by the embodiments of the present disclosure is used in the fields of geometric scene structure analysis, automatic driving, assisted driving, target tracking, automatic obstacle avoidance of robots, or the like. For example, in a driving scene, the method for the depth estimation of a monocular image provided by the embodiments of the present disclosure is used for predicting a distance from a front vehicle or a pedestrian. When photographing is performed by a mobile phone, a monocular blurring operation is performed using depth information predicted by the method for the depth estimation of a monocular image provided by the embodiments of the present disclosure; and the prediction result of the method for the depth estimation of a monocular image provided by the embodiments of the present disclosure facilitates improving an object tracking algorithm.

Figure 5:
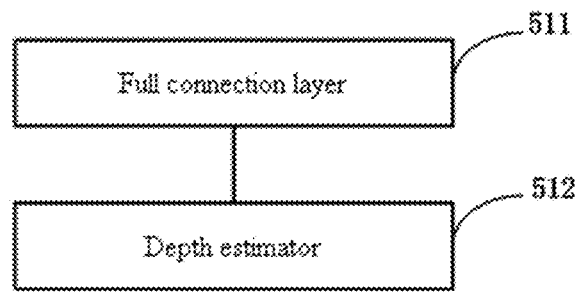
FIG. 5 is a schematic structural diagram of an apparatus for the depth estimation of a monocular image according to some embodiments of the present disclosure.

FIG. 5 is a schematic structural diagram of an apparatus for the depth estimation of a monocular image according to some embodiments of the present disclosure.

As shown in FIG. 5, the apparatus includes a depth estimation neural network 510. The depth estimation neural network 510 is configured to obtain a global feature of a monocular image according to absolute features of preset regions and relative features among the preset regions in the monocular image, and obtain a predicted depth map of the monocular image according to the global feature and the absolute features of preset regions and relative features among the preset regions in the monocular image.

In the embodiments, the monocular image may be an image obtained from an image collection device, and may also be an image obtained from a storage apparatus. For example, the image collection device may be a still camera, a video camera, a scanner, or the like, and the storage apparatus may be a USB flash drive, an optical disk, a hard disk drive, or the like. The embodiments do not limit the obtaining mode of the monocular image. The absolute features of the preset regions in the monocular image are used for representing local appearances of the preset regions in the monocular image. For example, the absolute features include texture features, geometric features, or the like. The relative features among the preset regions in the monocular image are used for representing the differences between the local appearances of the preset regions in the monocular image. For example, the relative features include texture differences, geometric differences, or the like. The preset regions in the monocular image are set according to the features of the image. The depth map of the embodiments is a map that represents the distances between pixels in an image and the image collection device using the pixels values of the pixels in the image.

In an optional example, as shown in FIG. 5, the depth estimation neural network 510 includes: a full connection layer 511, configured to obtain a global feature of a monocular image by combining absolute features of preset regions and relative features among the preset regions in the monocular image. The depth estimation neural network 510 further includes: a depth estimator 512, configured to perform depth estimation according to the global feature of the monocular image and the absolute features of preset regions and relative features among the preset regions in the monocular image to obtain a predicted depth map of the monocular image. For example, the depth estimator may be a fully convolutional network which mainly consists of a convolution layer and a deconvolution layer. The depth estimator is able to calculate depths values of pixels in an image according to geometric distribution information of the image, i.e., a global feature of the image, and absolute features of preset regions and relative features among the preset regions in the image, to obtain the predicted depth map.

The apparatus for the depth estimation of a monocular image provided by the embodiments obtains a global feature of a monocular image according to absolute features of preset regions and relative features among the preset regions in the monocular image on the basis of a depth estimation neural network, and obtains a predicted depth map of the monocular image according to the global feature and the absolute features of preset regions and relative features among the preset regions in the monocular image. By means of the mutual supplementation between relative features and absolute features of preset regions in an image in the depth estimation of monocular images, the accuracy of the relative distance prediction in the depth estimation is improved, such that the accuracy of the depth estimation of monocular images can be improved.

Figure 6:
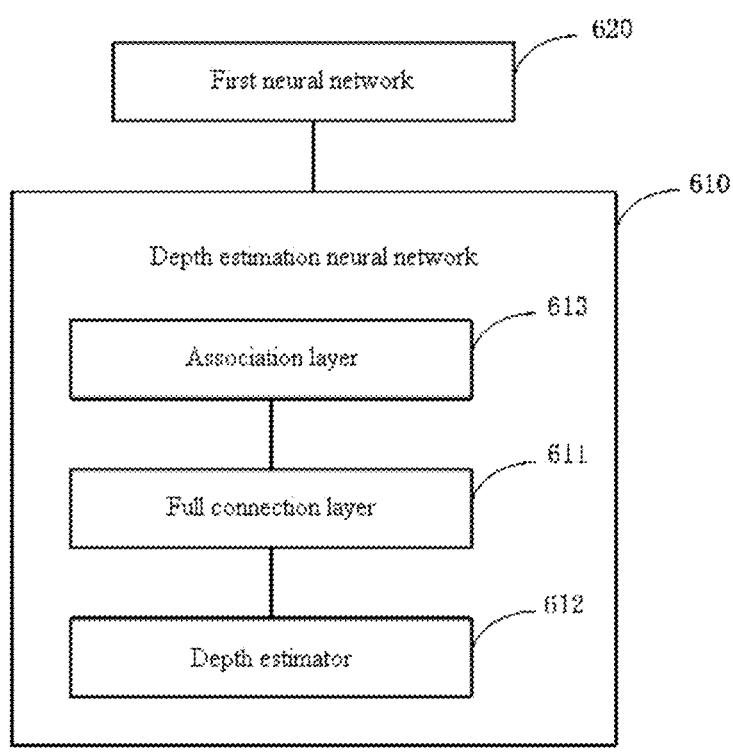
FIG. 6 is a schematic structural diagram of an apparatus for the depth estimation of a monocular image according to other embodiments of the present disclosure.

FIG. 6 is a schematic structural diagram of an apparatus for the depth estimation of a monocular image according to other embodiments of the present disclosure;

As shown in FIG. 6, as compared with the embodiment of FIG. 5, the difference therebetween is that the apparatus further includes a first neural network 620.

The first neural network 620 is configured to perform feature extraction on the monocular image to obtain features of preset regions in the monocular image, and take the features of the preset regions as absolute features of the preset regions in the monocular image. For example, the first neural network may be a coder network consisting of a convolution layer and a pooling layer, and high-dimension features of the image can be obtained by performing feature extraction on the monocular image by means of the coder network.

The depth estimation neural network 610 is further configured to obtain relative features among the preset regions in the monocular image according to the absolute features of the preset regions in the monocular image.

In an optional example, as shown in FIG. 6, the depth estimation neural network 610 further includes: an association layer 613, configured to perform vector operation on the absolute features of the preset regions in the monocular image to obtain the relative features among the preset regions in the monocular image. The relative features among the preset regions in the image may be relative features between the preset regions in the image and preset regions within a preset range surrounding said preset regions. For example, the relative features among the preset regions in the monocular image may be obtained by performing dot product operation on feature vectors between the preset regions in the monocular image and the preset regions within a preset range surrounding said preset regions.

According to one or more disclosure of the present disclosure, the apparatus further includes: a downsampling layer, configured to perform downsampling on the monocular image before performing feature extraction on the monocular image to obtain a monocular image having a preset dimension. In this case, the depth estimation neural network 610 performs depth estimation on the monocular image having a preset dimension to reduce the computation amount and improve the data processing speed. The dimension of the monocular image is a multiple of the preset dimension. For example, the dimension of the monocular image is 8 times of the preset dimension.

Figure 7:
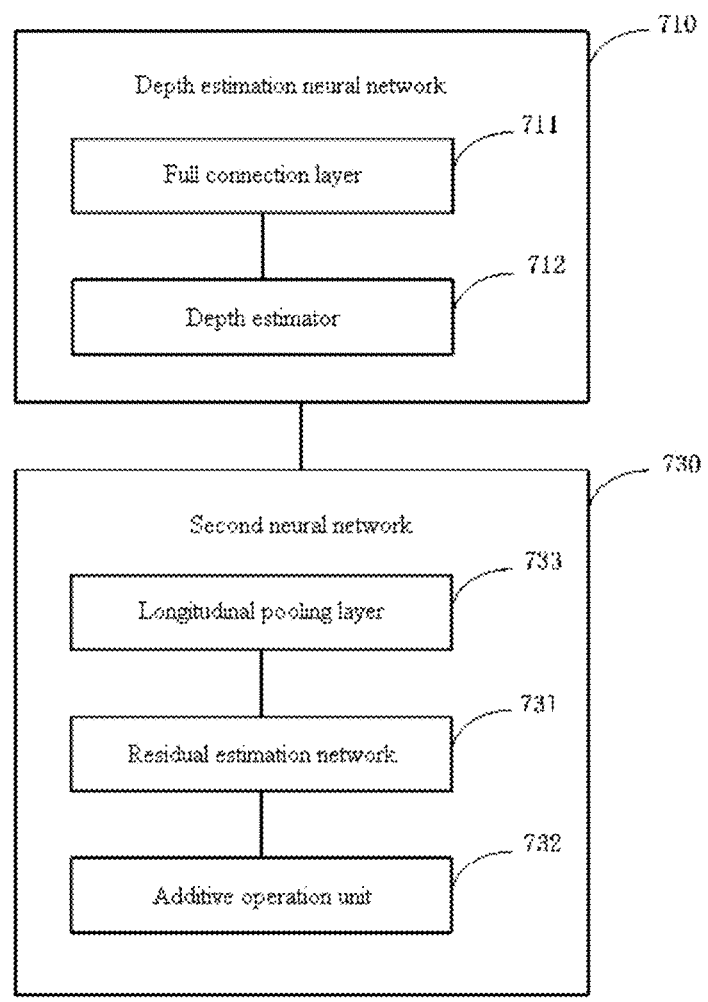
FIG. 7 is a schematic structural diagram of an apparatus for the depth estimation of a monocular image according to some other embodiments of the present disclosure.

FIG. 7 is a schematic structural diagram of an apparatus for the depth estimation of a monocular image according to other embodiments of the present disclosure.

As shown in FIG. 7, as compared with the embodiment of FIG. 5, the difference therebetween is that the apparatus further includes a second neural network 730.

The second neural network 730 is configured to perform optimization on the predicted depth image according to a longitudinal variation law of depth information of the monocular image to obtain a target depth map of the monocular image.

According to one or more disclosure of the present disclosure, the second neural network 730 is configured to perform residual estimation on the predicted depth map according to a longitudinal variation law of depth information of the monocular image to obtain a residual plot of the predicted depth map, and then perform optimization on the predicted depth map according to the residual plot to obtain a target depth map of the monocular image.

In an optional example, as shown in FIG. 7, the second neural network 730 includes: a residual estimation network 731, configured to perform residual estimation on the predicted depth map according to a longitudinal variation law of depth information of the monocular image to obtain a residual plot of the predicted depth map, and an additive operation unit 732, configured to perform pixel-by-pixel superposition operation on the residual plot and the predicted depth map to obtain a target depth map of the monocular image.

According to one or more disclosure of the present disclosure, the second neural network 730 is further configured to obtain a longitudinal variation law of depth information of the monocular image according to the predicted depth map.

In an optional example, as shown in FIG. 7, the second neural network 730 further includes: a longitudinal pooling layer 733, configured to perform processing on the predicted depth map to obtain a longitudinal variation law of depth information of the monocular image. The longitudinal pooling layer takes a column vector as a pooling kernel to perform pooling processing on the predicted depth map. For example, the longitudinal pooling layer uses a pooling kernel having a size of H×1 to perform average pooling processing on the predicted depth map, where H is an integer greater than 1.

The apparatus for the depth estimation of a monocular image provided by the embodiment obtains a global feature of a monocular image according to absolute features of preset regions and relative features among the preset regions in the monocular image on the basis of a depth estimation neural network, obtains a predicted depth map of the monocular image according to the global feature and the absolute features of preset regions and relative features among the preset regions in the monocular image, and performs optimization on the predicted depth map according to a longitudinal variation law of depth information of the monocular image to obtain a target depth map of the monocular image. By means of the mutual supplementation between relative features and absolute features of preset regions in an image in the depth estimation of monocular images, the accuracy of the relative distance prediction in the depth estimation is improved, and by means of optimization performed according to a longitudinal variation law of depth information of the image, the accuracy of the absolute distance prediction in depth estimation is improved, such that the accuracy of the depth estimation of monocular images can be comprehensively improved.

In some embodiments, when downsampling is performed, before performing feature extraction on the monocular image by means of the first neural network, on the monocular image by means of the downsampling layer to obtain a monocular image having a preset dimension, and the monocular image having a preset dimension is taken as the monocular image on which depth estimation is performed by the depth estimation neural network, a multi-scale learning method is used to perform optimization on the predicted depth map according to a longitudinal variation law of depth information of the monocular image to improve the accuracy of depth estimation of the monocular image.

According to one or more disclosure of the present disclosure, the apparatus further includes: an upsampling layer, configured to perform a preset number of upsamplings on the predicted depth map; a longitudinal pooling layer, configured to obtain a longitudinal variation law of depth information according to the predicted depth map, obtained by each upsampling, having a dimension sequentially increased by a multiple; and the second neural network, configured to perform optimization on the predicted depth map, obtained by each upsampling, having a dimension sequentially increased by a multiple according to the longitudinal variation law of the depth information thereof to obtain an optimized target depth map. The optimized target depth map obtained by each of the upsamplings other than the last upsampling is taken as the predicted depth map of the next upsampling, the optimized target depth map obtained by the last upsampling is taken as the target depth map of the monocular image, and the target depth map has the same dimension as the monocular image.

In an optional example, the depth estimation neural network of the forgoing embodiments is obtained by performing semi-supervised training using a dense depth map obtained by means of stereoscopic binocular image matching and a sparse depth map as marking data.

Figure 8:
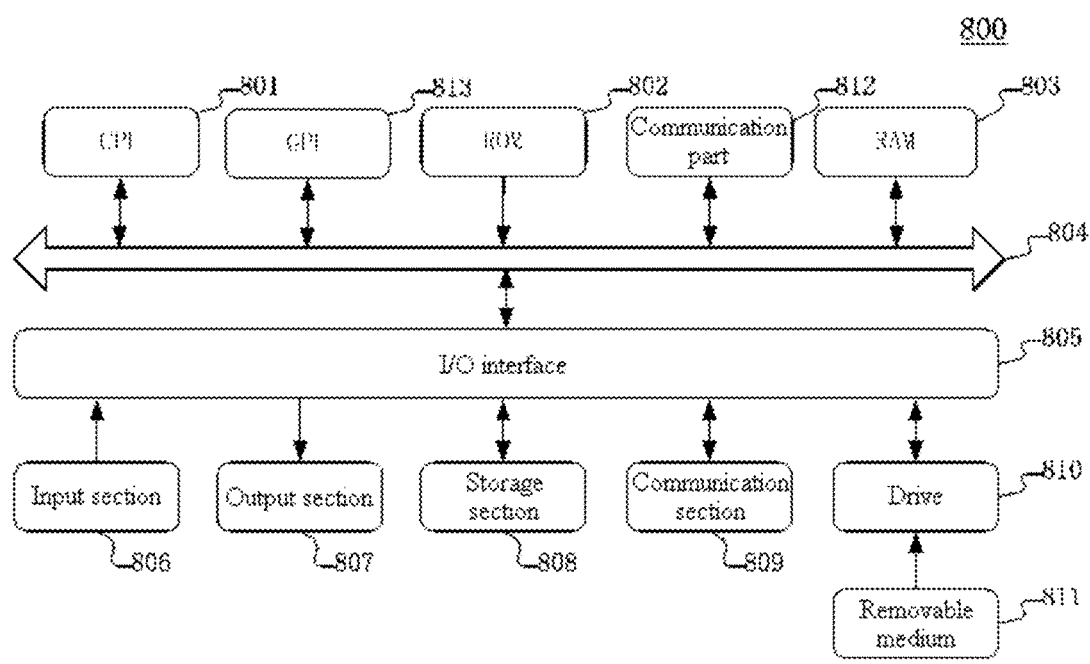
FIG. 8 is a schematic structural diagram of an electronic device provided by some embodiments of the present disclosure.

In an optional example, because the "marking data" of training data obtained using other methods is sparse, i.e., there are a small number of valid pixel values in a depth map, a depth map obtained using stereoscopic binocular image matching is taken as the "marking data" of the training data. The embodiments of the present disclosure further provide an electronic device which, for example, is a mobile terminal, a Personal Computer (PC), a tablet computer, a server, or the like. Referring to FIG. 8 below, a schematic structural diagram of an electronic device 800, which may be a terminal device or a server, suitable for implementing the embodiments of the present disclosure is shown. As shown in FIG. 8, the electronic device 800 includes one or more processors, a communication part, or the like. The one or more processors are, for example, one or more Central Processing Units (CPUs) 801 and/or one or more Graphic Processing Units (GPUs) 813, and may execute appropriate actions and processing according to executable instructions stored in a Read-Only Memory (ROM) 802 or executable instructions loaded from a storage section 808 to a Random Access Memory (RAM) 803. The communication part 812 may include, but not limited to, a network card. The network card may include, but not limited to, an Infiniband (IB) network card. The processor may communicate with the ROM 802 and/or the RAM 830, to execute executable instructions. The processor is connected to the communication part 812 via a bus 804, and communicates with other target devices via the communication part 812, thereby implementing corresponding operations of any method provided in the embodiments of the present disclosure, for example, on the basis of a depth estimation neural network, obtaining a global feature of a monocular image according to absolute features of preset regions and relative features among the preset regions in the monocular image, and obtaining a predicted depth map of the monocular image according to the global feature and the absolute features of preset regions and relative features among the preset regions in the monocular image.

In addition, the RAM 803 further stores various programs and data required for operations of an apparatus. The CPU 801, the ROM 802, and the RAM 803 are connected to each other by means of the bus 804. In the case that the RAM 803 exists, the ROM 802 is an optional module. The RAM 803 stores executable instructions, or writes the executable instructions into the ROM 802 during running, where the executable instructions cause the CPU 801 to execute corresponding operations of the foregoing communication method. An Input/Output (I/O) interface 805 is also connected to the bus 804. The communication part 812 may be integrated, or may be configured to have multiple submodules (for example, multiple IB network cards) connected to the bus.

The following components are connected to the I/O interface 805: an input section 806 including a keyboard, a mouse and the like; an output section 807 including a Cathode-Ray Tube (CRT), a Liquid Crystal Display (LCD), a speaker and the like; a storage section 808 including a hard disk and the like; and a communication section 809 of a network interface card including an LAN card, a modem and the like. The communication section 809 performs communication processing via a network such as the Internet. A drive 810 is also connected to the I/O interface 805 according to requirements. A removable medium 811 such as a magnetic disk, an optical disk, a magneto-optical disk, and a semiconductor memory is installed on the drive 810 according to requirements, so that a computer program read from the removable medium is installed on the storage section 808 according to requirements.

It should be noted that the architecture illustrated in FIG. 8 is merely an optional implementation mode. During specific practice, the number and types of the components in FIG. 8 may be selected, decreased, increased, or replaced according to actual requirements. Different functional components may be separated or integrated or the like. For example, the GPU 813 and the CPU 801 may be separated, or the GPU 813 may be integrated on the CPU 801, and the communication part may be separated from or integrated on the CPU 801 or the GPU 813 or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly included in a machine-readable medium. The computer program includes a program code for executing a method shown in the flowchart. The program code may include corresponding instructions for correspondingly executing operations of the methods provided by the embodiments of the present disclosure, for example, on the basis of a depth estimation neural network, obtaining a global feature of a monocular image according to absolute features of preset regions and relative features among the preset regions in the monocular image, and obtaining a predicted depth map of the monocular image according to the global feature and the absolute features of preset regions and relative features among the preset regions in the monocular image. In such embodiments, the computer program is downloaded and installed from the network through the communication section 809, and/or is installed from the removable medium 811. The computer program, when being executed by the CPU 801, executes the foregoing functions defined in the methods of the present disclosure.

In one or more optional implementations, the embodiments of the present disclosure also provide a computer program product configured to store computer-readable instructions, where when the instructions are executed, a computer executes the image recovery method in any of the possible embodiments.

The computer program product is specifically implemented by means of hardware, software, or a combination thereof. In an optional example, the computer program product is specifically represented by a computer storage medium. In another optional example, the computer program product is represented by a software product, such as a Software Development Kit (SDK).

In one or more optional implementations, the embodiments of the present disclosure also provide a method for the depth estimation of a monocular image and an apparatus corresponding thereto, an electronic device, a computer storage medium, a computer program, and a computer program product. The method includes: sending, by a first apparatus, an instruction for the depth estimation of a monocular image to a second apparatus, where the instruction causes the second apparatus to execute the method for the depth estimation of a monocular image according to any one of the possible embodiments; and receiving, by the first apparatus, a result of the depth estimation of the monocular image sent by the second apparatus.

In some embodiments, the instruction for the depth estimation of a monocular image is specifically an invoking instruction. The first apparatus instructs, by means of invoking, the second apparatus to execute the depth estimation of a monocular image. Accordingly, in response to receiving the invoking instruction, the second apparatus executes the operations and/process in any of the embodiments of the method for the depth estimation of a monocular image.

It should be understood that the terms such as "first" and "second" in the embodiments of the present invention are only used for distinguishing, and shall not be understood as limitations on the embodiments of the present invention.

It should also be understood that, in the present invention, "multiple" may refer to two or more, and "at least one" may refer to one, two or more.

It should also be understood that, for any component, data or structure mentioned in the present disclosure, if there is no explicit limitation or no opposite motivation is provided in context, it is generally understood that the number of the component, data or structure is one or more.

It should also be understood that, the descriptions of the embodiments in the present disclosure focus on differences between the embodiments, and for same or similar parts in the embodiments, refer to these embodiments. For the purpose of brevity, details are not described again.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A computer-implemented method for depth estimation of a monocular image, comprising: obtaining, through a depth estimation neural network, a global feature of a monocular image according to absolute features of preset regions and relative features among the preset regions in the monocular image; and obtaining a predicted depth map of the monocular image according to the global feature, the absolute features of preset regions and the relative features among the preset regions in the monocular image.

2. The method according to claim 1, wherein before the obtaining a global feature of a monocular image according to absolute features of preset regions and relative features among the preset regions in the monocular image, the method further comprises:
performing, through a first neural network, feature extraction on the monocular image to obtain features of preset regions in the monocular image, and taking the features of the preset regions as the absolute features of the preset regions in the monocular image; and
obtaining the relative features among the preset regions in the monocular image according to the absolute features of the preset regions in the monocular image.

3. The method according to claim 2, wherein the obtaining relative features among the preset regions in the monocular image according to the absolute features of the preset regions in the monocular image comprises:
performing, through an association layer, a vector operation on the absolute features of the preset regions in the monocular image to obtain the relative features among the preset regions in the monocular image.

4. The method according to claim 2, wherein before performing, through a first neural network, feature extraction on the monocular image, the method further comprises:
performing downsampling on the monocular image to obtain a monocular image having a preset dimension, wherein a dimension of the monocular image is a multiple of the preset dimension.

5. The method according to claim 1, wherein the obtaining a global feature of a monocular image according to absolute features of preset regions and relative features among the preset regions in the monocular image comprises:
obtaining, through a full connection layer, the global feature of the monocular image by combining the absolute features of the preset regions and the relative features among the preset regions in the monocular image.

6. The method according to claim 1, wherein the obtaining a predicted depth map of the monocular image according to the global feature and the absolute features of preset regions and relative features among the preset regions in the monocular image comprises:
performing, through a depth estimator, depth estimation according to the global feature, the absolute features of the preset regions and the relative features among the preset regions in the monocular image to obtain the predicted depth map of the monocular image.

7. The method according to claim 1, wherein after the obtaining a predicted depth map of the monocular image according to the global feature, the absolute features of preset regions and relative features among the preset regions in the monocular image, the method further comprises:
performing optimization on the predicted depth map according to a longitudinal variation law of depth information of the monocular image to obtain a target depth map of the monocular image.

8. The method according to claim 7, wherein the performing optimization on the predicted depth map according to a longitudinal variation law of depth information of the monocular image to obtain a target depth map of the monocular image comprises:
performing residual estimation on the predicted depth map according to the longitudinal variation law of depth information of the monocular image to obtain a residual plot of the predicted depth map; and
performing optimization on the predicted depth map according to the residual plot to obtain the target depth map of the monocular image.

9. The method according to claim 8, wherein the performing residual estimation on the predicted depth map according to a longitudinal variation law of depth information of the monocular image to obtain a residual plot of the predicted depth map comprises:
performing, through a residual estimation network, residual estimation on the predicted depth map according to the longitudinal variation law of depth information of the monocular image to obtain a residual plot of the predicted depth map; and
the performing optimization on the predicted depth map according to the residual plot to obtain a target depth map of the monocular image comprises
performing a pixel-by-pixel superposition operation on the residual plot and the predicted depth map to obtain the target depth map of the monocular image.

10. The method according to claim 7, wherein before the performing optimization on the predicted depth map according to a longitudinal variation law of depth information of the monocular image to obtain a target depth map of the monocular image, the method further comprises:
obtaining the longitudinal variation law of depth information of the monocular image according to the predicted depth map.

11. The method according to claim 10, wherein the obtaining a longitudinal variation law of depth information of the monocular image according to the predicted depth map comprises:
performing, through a longitudinal pooling layer, processing on the predicted depth map to obtain the longitudinal variation law of depth information of the monocular image.

12. The method according to claim 7, wherein the performing optimization on the predicted depth map according to a longitudinal variation law of depth information of the monocular image comprises:

performing a preset number of upsamplings on the predicted depth map, obtaining the longitudinal variation law of depth information according to a predicted depth map, obtained by each upsampling, having a dimension sequentially increased by a multiple, and performing optimization on the predicted depth map, obtained by each upsampling, having a dimension sequentially increased by a multiple according to the obtained longitudinal variation law of the depth information to obtain an optimized target depth map;

wherein the optimized target depth map obtained by each of the upsamplings other than a last upsampling is taken as a predicted depth map of a next upsampling, the optimized target depth map obtained by the last upsampling is taken as the target depth map of the monocular image, and the target depth map has the same dimension as the monocular image.

13. The method according to claim 1, wherein the depth estimation neural network comprises an association layer, a full connection layer, and a depth estimator, and is obtained by training the depth estimation neural network by using a sparse depth map and a dense depth map obtained by stereo matching for binocular images as marking data.

14. An apparatus for the depth estimation of a monocular image, comprising: one or more processors; and a memory, configured to storing instructions executable by the one or more processors, wherein the one or more processors are configured to: obtain, through a depth estimation neural network, a global feature of a monocular image according to absolute features of preset regions and relative features among the preset regions in the monocular image, and obtain a predicted depth map of the monocular image according to the global feature and the absolute features of preset regions and the relative features among the preset regions in the monocular image.

15. The apparatus according to claim 14, wherein the one or more processors are further configured to:

perform, through a first neural network, feature extraction on the monocular image to obtain features of preset regions in the monocular image, and take the features of the preset regions as the absolute features of the preset regions in the monocular image; and obtain, through the depth estimation neural network, the relative features among the preset regions in the monocular image according to the absolute features of the preset regions in the monocular image.

16. The apparatus according to claim 15, wherein the depth estimation neural network comprises:

an association layer, and the one or more processors are configured to perform, through the association layer, a vector operation on the absolute features of the preset regions in the monocular image to obtain the relative features among the preset regions in the monocular image.

17. The apparatus according to claim 15, wherein the one or more processors are further configured to:

perform, through a downsampling layer, downsampling on the monocular image before performing feature extraction on the monocular image to obtain a monocular image having a preset dimension, wherein a dimension of the monocular image is a multiple of the preset dimension.

18. The apparatus according to claim 14, wherein the depth estimation neural network comprises:

a full connection layer, and the one or more processors are configured to obtain, through the full connection layer, the global feature of the monocular image by combining the absolute features of the preset regions and the relative features among the preset regions in the monocular image; or a depth estimator, and the one or more processors are configured to perform, through the depth estimator, depth estimation according to the global feature and the absolute features of the preset regions and the relative features among the preset regions in the monocular image to obtain the predicted depth map of the monocular image.

19. The apparatus according to claim 14, wherein the one or more processors are further configured to:

perform, through a second neural network, optimization on the predicted depth map according to a longitudinal variation law of depth information of the monocular image to obtain a target depth map of the monocular image.

20. A non-transitory computer storage medium, configured to store computer readable instructions that, when being executed, implement a method for depth estimation of a monocular image, comprising: obtaining, through a depth estimation neural network, a global feature of a monocular image according to absolute features of preset regions and relative features among the preset regions in the monocular image; and obtaining a predicted depth map of the monocular image according to the global feature, the absolute features of preset regions and the relative features among the preset regions in the monocular image.

* * * * *